2,836,603

POLYCYCLIC DIHYDROPYRANS AND PREPARATION THEREOF

William S. Emerson, Dayton, Ohio, and Raymond I. Longley, Jr., Springfield, Mass., assignors to Monsanto Chemical Company, St. Louis, Mo., a corporation of Delaware No Drawing. Application March 9, 1953
Serial No. 341,376

17 Claims. (Cl. 260—340.5)

This invention relates to the process of producing polycyclic dihydropyrans and to the novel products produced thereby. More particularly this invention relates to the preparation of polycyclic dihydropyrans by the Diels-Alder reaction of a benzalcycloketone and derivatives thereof, wherein the benzal and oxo radicals are on contiguous carbon atoms, with an alkyl vinyl ether having a molecular weight up to about 100, preferably in the presence of a small amount of a polymerization inhibitor, effective to prevent, or substantially reduce, the polymerization of the ethylenically-unsaturated reactants. Said reaction is brought about in the liquid phase under superatmospheric pressure and in the presence of an inert atmosphere which is substantially free from oxygen.

One object of the present invention is to prepare new polycyclic dihydropyrans which compounds are useful as chemical intermediates and as biological toxicants. Another object of this invention is to provide a new procedure whereby the aforesaid new chemical compounds can be prepared. Still another object of this invention is to provide a method of reacting a benzalcycloketone and derivatives thereof, wherein the benzal and oxo radicals are on contiguous carbon atoms, with an alkyl vinyl ether, wherein the alkyl radical contains up to 4 carbon atoms, preferably in the presence of an effective amount of a polymerization inhibitor and under superatmospheric pressure conditions.

The preparation of the novel compounds of this invention can be diagrammatically shown by the following equation:

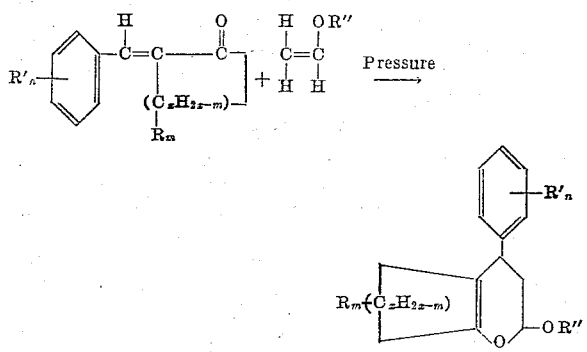

wherein R″ is an alkyl radical containing up to 4 carbon atoms; R′ is selected from at least one member of the group consisting of monovalent hydrocarbon radicals containing up to 8 carbon atoms and free from non-benzenoid unsaturation, and mono- and divalent hydrocarbonoxy radicals containing up to the sum of 8 carbon atoms and oxygen atoms, but not more than 2 oxygen atoms, and the said radicals are free from non-benzenoid unsaturation and where said radical contains more than 1 oxygen atom the oxygen atoms are bonded to contiguous carbon atoms of the benzene ring; $n$ is an integer from 0 to 2 and represents the number of valent bonds of the R′ radical times the number of said radicals; R is a substituent to the divalent alkylene radical selected from at least one member of the group consisting of alkyl, alkoxy, aryl and oxo radicals and a fused carbocyclic ring, free from non-benzenoid unsaturation, said ring being fused to contiguous carbon atoms of said alkylene radical, and the sum of the carbon and oxygen atoms of R plus $x$ does not exceed 10; $m$ is an integer from 0 to 4 and represents the number of valent bonds of the R radicals times the number of said radicals; and $x$ is an integer from 3 to 5, inclusive.

Accordingly, it is seen that the benzalcycloketones and derivatives thereof are solely composed of the elements from the group C, H and O, and all substituents are free from non-benzenoid unsaturation. Also the sum of the number of carbon and oxygen atoms in the substituents does not exceed 26 and preferably does not exceed 12.

Suitable illustrative alkyl vinyl ethers are methyl vinyl ether, ethyl vinyl ether, n-propyl vinyl ether, isopropyl vinyl ether, n-butyl vinyl ether, isobutyl vinyl ether, sec-butyl vinyl ether, and tert-butyl vinyl ether.

Whereas, as aforesaid, the cycloketone portion of the benzalcycloketone can contain from 5 to 7 carbon atoms the compounds from the group consisting of the 5- and 6-membered compounds are preferred, that is, wherein $x$ is an integer from 3 to 4, which class of compounds can be generically described as the benzalcyclopentanones and benzalcyclohexanones, and derivatives of same, wherein the substituents are as disclosed above.

The R′ substituent of the benzalcycloketone can be a hydrocarbon and/or a hydrocarbonoxy radical selected from at least one member of the group consisting of alkyl, cycloalkyl, aryl, aralkyl, alkaryl, alkoxy, cycloalkoxy, aryloxy, aralkoxy, alkaryloxy, and alkylenedioxy radicals, said radicals containing up to the sum of 8 carbon plus oxygen atoms and being free from non-benzenoid unsaturation; for example, methyl, ethyl, propyl, isopropyl, butyl, tert-butyl, hexyl, 2-ethylhexyl, cyclopropyl, cyclopentyl, cyclohexyl, ethylcyclohexyl, phenyl, benzyl, phenethyl, tolyl, xylyl, methoxy, ethoxy, propoxy, isopropoxy, butoxy, pentoxy, isopentoxy, heptoxy, cyclopropoxy, cyclohexoxy, methylcyclopentoxy, phenoxy, benzyloxy, toloxy, methylenedioxy, ethylenedioxy, and the like.

Illustrative R substituents of the benzalcycloketones are, for example; methyl, ethyl, propyl, butyl, hexyl, methoxy, ethoxy, butoxy, pentoxy, heptoxy, and branched-chain members thereof; phenyl, oxo, the fused benzene ring, the fused cyclohexane ring, and the like.

A few illustrative "benzalcycloketones" are, for example:

2-benzalcyclopentanone,
2-benzalcyclohexanone,
2-benzalcycloheptonone,
2-piperonylidenecyclohexanone,
2-veratrylidenecyclohexanone,
2-piperonylidene-1,3-indandione,
2-veratrylidene-1,3-indandione,
2-(p-tolual)-4-methylcyclohexanone,
2-benzal-4-phenylcyclopentanone,
2-benzal-4-phenylcyclohexanone,
2-(p-ethylbenzal)cyclohexanone,
2-benzal-α-decalone,
2-benzal-α-tetralone,
1-benzal-β-tetralone,
2-benzalindanone, and the like.

The reaction between the benzalcycloketone and the alkyl vinyl ether to provide the new polycyclic dihydropyrans of this invention is performed by mixing the reactants in substantially stoichiometric proportions, or with an excess of the alkyl vinyl ether, and heating to a temperature between about 100° C. and about 250° C., and preferably from about 150° C. to about 220° C., with or without a suitable polymerization inhibitor, for a period of time of from about 2 to about 24 or more hours, and thereafter separating the resulting product, as for example, by distilling the reaction mixture under reduced pressure. The reaction, however, can be conducted with an excess of either reactant, although in such circumstances actual reaction will be in stoichiometric proportions and the excess of either reactant may be recovered from the reaction mixture. One embodiment of the instant invention is the reaction of equimolecular amounts of the two aforesaid reactants. Whereas greater or lesser amounts of either reactant can be employed it is preferred that the alkyl vinyl ether be used in excess up to about 10 to 1, and more preferably the ether is employed in excess up to about 4 to 1, whereby the more volatile component may be readily recovered from the reaction mixture. The reaction is carried out in a suitable bomb or autoclave under the autogenous pressure developed by heating the reaction mixture to the desired temperature, which procedure substantially maintains the system in the liquid phase.

The following examples are illustrative of the invention.

Example 1

A 300-ml., stainless-steel, rocking autoclave was charged with 70 g. (0.41 mole) of 2-benzalcyclopentanone, 60 g. (0.83 mole) of ethyl vinyl ether, and about 0.1 g. of hydroquinone. The autoclave was flushed with nitrogen before and after charging the reaction mixture. The autoclave was sealed and heated with shaking to about 115° C. in about 30 minutes, then the temperature was held substantially constant for about 3 hours, then the temperature was raised to and held between about 181 to 195° C. for about 17 hours. The autoclave and contents were cooled and the reaction mixture removed. The excess ethyl vinyl ether and low-boiling materials were removed by distillation (up to about 47° C./33 mm. Hg) and the high-boiling liquid product was transferred to a Claisen flask and fractionated. The principal product was a liquid having a boiling point of about 162 to 168° C./2 mm. Hg, and $n_D^{25}$ 1.5798. The yield was 38 percent. The product was identified as 2-ethoxy-3,4-dihydro-4-phenyl-5,6-trimethylene-2H-pyran.

Calculated for $C_{16}H_{20}O_2$: C, 78.7; H, 8.25. Found: C, 79.1; H, 8.04.

Example 2

The 300-ml., stainless-steel, rocking autoclave was charged with 102 g. (0.55 mole) of 2-benzalcyclohexane, 50 g. (0.69 mole) of ethyl vinyl ether, and 0.1 g. of hydroquinone. The autoclave and contents were heated slowly with rocking to about 100° C., then rocking was discontinued and heating continued slowly to about 210° C., at which temperature the reaction mixture was held for 28 hours. The autoclave and contents were cooled and the reaction mixture removed. The red liquid reaction mixture was stripped to 200° C./13 mm. Hg. The balance of the reaction mixture was fractionally distilled. The principal product had a boiling point of about 160 to 162° C./4 mm. Hg, and $n_D^{25}$ 1.5346. The yield was 52 percent. The product was identified as 2-ethoxy - 3,4,5,6,7,8 - hexahydro-4-phenyl-2H-benzopyran.

Calculated for $C_{17}H_{22}O_2$: C, 79.1; H, 8.5. Found: C, 79.1; H, 8.6.

Example 3

The 300-ml., stainless-steel, rocking autoclave was flushed with nitrogen and charged with 55.5 g. (0.25 mole) of 2-piperonylidenecyclohexanone, 60 g. (0.83 mole) of ethyl vinyl ether, and about 0.1 g. of hydroquinone. The autoclave was again flushed with nitrogen, sealed, and warmed with rocking to 100° C. over a period of about 1 hour and maintained thereat for about 3 hours. The temperature was then increased to 195° C. and held between about 190 and 195° C. for 16 hours. The autoclave and contents were cooled, the reaction mixture transferred to a distillation flask, and the low-boiling fraction stripped therefrom. The balance of the reaction mixture was then fractionally distilled. A liquid having a boiling point of 174 to 184° C./3 mm. Hg, and $n_D^{25}$ 1.5538 was obtained. The yield was 22 percent. The product was identified as 2-ethoxy-3,4,5,6,7,8 - hexahydro - 4 - (3,4-methylenedioxyphenyl)-2H-benzopyran.

Calculated for $C_{18}H_{22}O_4$: C, 71.5; H, 7.33. Found: C, 71.6; H, 7.25.

Example 4

The 300-ml., stainless-steel, rocking autoclave was charged with 73 g. (0.30 mole) of 2-veratrylidenecyclohexanone, 60 g. (0.83 mole) of ethyl vinyl ether, and 0.1 g. of hydroquinone. The autoclave was flushed with nitrogen and heated to about 190° C., at which temperature the reaction mixture was held for 16 hours. Thereafter the autoclave and contents were cooled and the reaction mixture distilled to provide a 40 percent yield of a compound having a boiling point of 211 to 216° C./1 mm. Hg. and $n_D^{25}$ 1.5499. The product was identified as 2-ethoxy-3,4,5,6,7,8-hexahydro-4-(3,4-dimethoxyphenyl)-2H-benzopyran.

Calculated for $C_{19}H_{26}O_4$: C, 71.7; H, 8.17. Found: C, 72.1; H, 8.06.

Example 5

The 300-ml., stainless-steel, rocking autoclave was charged with 78 g. (0.28 mole) of 2-piperonylidene-1,3-inandione, 25 g. (0.35 mole) of ethyl vinyl ether, 0.2 g. of hydroquinone, and 50 ml. of hexane. The autoclave was swept with nitrogen prior to and during the charging of same. The autoclave and contents were heated with rocking to about 150° C. over about a 5.5-hour period and thereafter held at about 150° C. for 15.5 hours. The autoclave and contents were cooled and the substantially solid reaction mixture was removed therefrom. The reaction mixture was dissolved in hot xylene and cooled slowly to yield a small amount of an orange, amorphous solid and a major amount of a product which was recrystallized several times from xylene to give a yield of 49 percent of a crystalline solid having a melting point of 130 to 132° C. This compound was identified as 1-(3,4 - methylenedioxyphenyl) - 3 - ethoxy-1,2,3,4-tetrahydro-4-oxa-9-fluorenone.

Calculated for $C_{21}H_{18}O_5$: C, 72.0; H, 5.18. Found: C, 72.1; H, 5.09.

Example 6

The 300-ml., stainless-steel, rocking autoclave was flushed with nitrogen and charged with 84 g. (0.28 mole) of 2-veratrylidene-1,3-indandione, 31 g. (0.43 mole) of ethyl vinyl ether, 0.2 g. of hydroquinone, and 75 ml. of xylene. The autoclave and contents were heated with rocking to about 150° C. over about a 5.5-hour period and thereafter held at about 150° C. for 15.5 hours. The autoclave and contents were cooled to about 60 to 70° C. and transferred to a large evaporating dish. Sufficient additional warm xylene was added to dissolve the solids present in the reaction mixture. The reaction mixture was then slowly cooled and fractionally crystallized. Upon recrystallization from xylene a crop of crystals having a melting point of 122 to 124° C. was obtained. The yield was 43 percent. The compound was identified as 1-(3,4-dimethoxyphenyl)-3-ethoxy-1,2,3,4-tetrahydro-4-oxa-9-fluorenone.

Calculated for $C_{22}H_{22}O_5$: C, 72.1; H, 6.05. Found: C, 71.9; H, 5.92.

Hydroquinone can be employed as a polymerization inhibitor, that is as a compound which is effective in preventing, or substantially reducing, the polymerization of polymerizable ethylenically-unsaturated compounds as employed in the instant invention. The polymerization inhibitor usually is employed in an amount which is effective in preventing, or substantially reducing, said polymerization. It has been found that amounts of polymerization inhibitor of from about 0.01 to about 5 mole percent and preferably from about 0.01 to about 1 mole percent, based on the reactants, are generally satisfactory. Whereas hydroquinone is the preferred polymerization inhibitor, other suitably effective materials, or mixtures thereof, can be employed. These materials include, for example, other phenolic compounds, quinones, nitroaryl compounds, and the like, such as, phenol, cresols, xylenols, naphthols, catechol, resorcinol, orcinol, pyrogallol, phloroglucinol, guaiacol; di-t-butyl hydroquinone; nitrophenols, nitrosophenols, α-nitroso-β-naphthol; and the like.

The reaction is carried out in a pressure vessel under superatmospheric pressures. The reactants, inhibitors, and diluents, if any, are charged to the pressure vessel, after which substantially all of the oxygen is removed from the vapor space by evacuation or sweeping with an inert atmosphere, such as nitrogen. Then the pressure vessel is sealed and heat applied to raise the temperature of the reaction mixture to the desired range, as hereinafter more fully exemplified. The normal pressure employed is the autogenous pressure obtained in processing the selected reaction mixture, sealed under the then prevailing ambient atmospheric conditions, to the desired reaction temperature. After flushing, the vessel can also be initially pressured with an inert gas, such as nitrogen, to provide a reaction pressure substantially greater than the normal autogenous pressure. In general, the pressure ranges up to about 200 atmospheres, or higher, during the greater portion of the reaction period, and is only limited by the choice of suitable commercial equipment.

The temperature employed in the instant process can range from about 100° C. to about 250° C. and higher, but below the decomposition temperature of the reactants and the products produced therefrom. The generally preferred range of reaction temperature is from about 150° C. to about 220° C. The time of reaction is selected to provide a sufficient time to obtain a substantial yield of the desired polycyclic dihydropyran. The time of reaction will depend on the reactants employed and the temperature of processing selected, but will generally range from about 2 hours to about 24 hours; however, shorter or longer reaction periods can be employed when desired.

Upon termination of the reaction the reaction mixture can be allowed to cool slowly or can be cooled rapidly to about room temperature, or higher, by any suitable means. The pressure vessel is then vented and the reaction mixture removed therefrom. The desired polycyclic dihydropyran is then obtained from the reaction mixture by fractional distillation, fractional crystallization, or other suitable procedures and the excess reactants are recovered.

The process disclosed herein can be carried out in the absence of other materials than the disclosed reactants and polymerization inhibitors. This is the preferred embodiment where the reactants and products produced therefrom are liquids at a temperature somewhat below the maximum reaction temperature employed. That is, the reaction is carried out in the liquid phase. When one of the reactants or the product produced therefrom has a relatively high melting point it is desirable to effect the reaction in the presence of an inert organic solvent, that is, an inert liquid diluent. Such a diluent can also be employed with the lower boiling materials, if desired, but generally is not advantageous therein. Suitable inert organic liquid diluents are the saturated hydrocarbons, aromatic hydrocarbons, saturated ethers, and the like, for example, hexane, benzene, xylene, dioxane, and the like.

Other polycyclic dihydropyrans can be prepared in a similar manner under the above-described conditions and illustrative examples from the disclosed benzalcycloketones and alkyl vinyl ethers, as will be apparent to those skilled in the art.

The novel compounds of this invention are useful as chemical intermediates and as biological toxicants such as the toxic component, in whole or in part, in insecticidal compositions, and the like. For example, spray residue containing 0.1 percent of 2-ethoxy-3,4-dihydro-4-phenyl-5,6-trimethylene-2H-pyran was found to kill more than about 90 percent of the milkweed bugs tested and no phytoxocity was noted with bean plants at materially higher toxicants concentrations. The novel compounds may also be used as synergists for other insecticides, as for example, pyrethrum.

We claim:
1. The compounds having the structural formula

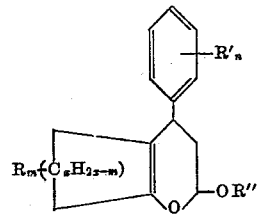

wherein R″ is an alkyl radical containing up to 4 carbon atoms; R′ is selected from at least one member of the group consisting of monovalent hydrocarbon radicals containing up to 8 carbon atoms and free from non-benzenoid unsaturation, and mono- and divalent hydrocarbonoxy radicals selected from the group consisting of methoxy and methylenedioxy radicals; n is an integer from 0 to 2 and represents the number of valent bonds of the R′ radical times the number of said radicals; R is a substituent to the divalent alkylene radical selected from at least one member of the group consisting of alkyl, alkoxy, and aryl radicals and not more than one oxo radical, wherein the carbon of the carbonyl radical containing the oxo group is contained as a link in the polymethylene chain which comprises the carbocyclic ring fused at the 5,6-position of the substituted 3,4-dihydropyran molecule, and a fused benzene ring, said ring being fused to contiguous carbon atoms of said alkylene radical, and the sum of the carbon and oxygen atoms of R plus x does not exceed 10; m is an integer from 0 to 4 and represents the number of valent bonds of the R radicals times the number of said radicals; and x is an integer from 3 to 5.

2. The 2-alkoxy-3,4-dihydro-4-phenyl-5,6-polymethylene-2H-pyrans having the formula

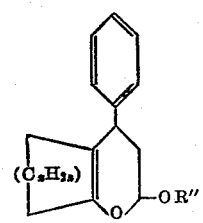

wherein R″ is an alkyl radical containing up to 4 carbon atoms and x is an integer from 3 to 5.

3. The compound 2-ethoxy-3,4-dihydro-4-phenyl-5,6-trimethylene-2H-pyran having the formula

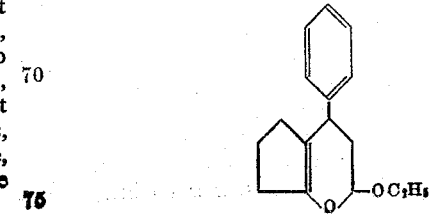

4. The compound 2 - ethoxy - 3,4,5,6,7,8 - hexahydro-4-phenyl-2H-benzopyran having the formula

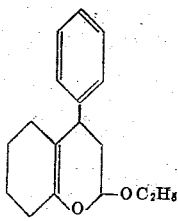

5. The compound 2 - ethoxy - 3,4,5,6,7,8 - hexahydro-4 - (3,4 - methylenedioxyphenyl) - 2H - benzopyran having the formula

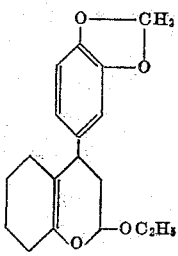

6. The compound 2 - ethoxy - 3,4,5,6,7,8 - hexahydro-4 - (3,4 - dimethoxyphenyl) - 2H - benzopyran having the formula

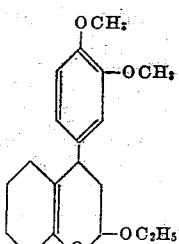

7. The compound 1 - (3,4 - dimethoxyphenyl) - 3 - ethoxy - 1,2,3,4, - tetrahydro - 4 - oxa -9 - fluorenone having the formula

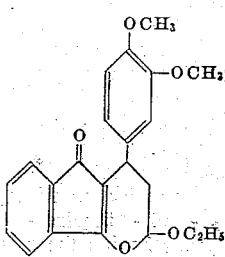

8. The process of preparing polycyclic dihydropyrans comprising the reaction of (A) a benzalcycloketone having the formula

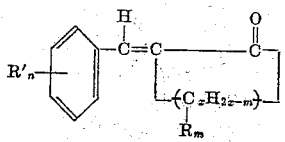

wherein R is a substituent to the divalent alkylene radical selected from at least one member of the group consisting of alkyl, alkoxy, and aryl radicals and not more than one oxo radical, wherein the carbon of the carbonyl radical containing the oxo group is contained as a link in the polymethylene chain which comprises the carbocyclic ring fused at the 5,6-position of the substituted 3,4-dihydropyran molecule, and a fused benzene ring, said ring being fused to contiguous carbon atoms of said alkylene radical, and the sum of the carbon and oxygen atoms of R plus $x$ does not exceed 10; $m$ is an integer from 0 to 4 and represents the number of valent bonds of the R radicals times the number of said radicals; $x$ is an integer from 3 to 5; R' is selected from at least one member of the group consisting of monovalent hydrocarbon radicals containing up to 8 carbon atoms and free from non-benzenoid unsaturation, and mono- and divalent hydrocarbonoxy radicals selected from the group consisting of methoxy and methylenedioxy radicals; and $n$ is an integer from 0 to 2 and represents the number of valent bonds of the R' radical times the number of said radicals; with (B) a low molecular weight alkyl vinyl ether, wherein the alkyl radical contains up to 4 carbon atoms; and the mole ratio of the benzalcycloketone to the alkyl vinyl ether is from about 1:1 to about 1:10; in the presence of an inert atmosphere which is substantially free from oxygen; said reaction being carried out under pressure at a temperature of from about 100° C. to about 250° C. for a time of from about 2 to about 24 hours to provide a substantial yield of the polycyclic dihydropyran product and recovery of said product from the reaction mixture.

9. The process of claim 8 wherein the reaction is brought about in the presence of up to about 5 mole percent, based on the reactants, of a polymerization inhibitor.

10. The process of claim 8 wherein the reaction is brought about in the presence of an inert organic liquid diluent.

11. The process of preparing the 2-alkoxy-3,4-dihydro-4-phenyl-5,6-polymethylene-2H-pyrans of claim 2, wherein the alkoxy radical contains up to 4 carbon atoms and the polymethylene radical contains from 3 to 5 carbon atoms, comprising the reaction of (A) a 2-benzalcycloketone having the formula

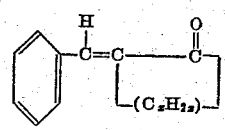

wherein $x$ is an integer from 3 to 5, with (B) a low molecular weight alkyl vinyl ether, wherein the alkyl radical contains up to 4 carbon atoms; and the mole ratio of the 2-benzalcycloketone to the alkyl vinyl ether is from about 1:1 to about 1:10; in the presence of up to about 1 mole percent, based on the reactants, of a polymerization inhibitor and an inert atmosphere which is substantially free from oxygen; said reaction being carried out under pressure at a temperature of from about 100° C. to about 250° C. for a time of from about 2 to about 24 hours to provide a substantial yield of the polycyclic dihydropyran product and recovery of said product from the reaction mixture.

12. The process of claim 11 wherein the polymerization inhibitor is hydroquinone, the inert atmosphere is nitrogen, and the ratio of the benzalcycloketone to the alkyl vinyl ether is from about 1:1 to about 1:4.

13. The process of preparing 2-ethoxy-3,4-dihydro-4-phenyl-5,6-trimethylene-2H-pyran comprising the reaction of 1 mole equivalent of 2-benzalcyclopentanone with from about 1 to about 4 mole equivalents of ethyl vinyl ether in the presence of up to about 1 mole percent, based on the reactants, of hydroquinone and a nitrogen atmosphere which is substantially free from oxygen; said reaction being carried out under pressure at a temperature of from about 150° C. to about 220° C. for a time of from about 2 to about 24 hours to provide a substantial yield of 2-ethoxy-3,4-dihydro-4-phenyl-5,6-trimethylene-2H-pyran product and recovery of said product from the reaction mixture.

14. The process of preparing 2-ethoxy-3,4,5,6,7,8-hexahydro-4-phenyl-2H-benzopyran comprising the reaction of 1 mole equivalent of 2-benzalcyclohexanone with from about 1 to about 4 mole equivalents of ethyl vinyl ether in the presence of up to about 1 mole percent, based on the reactants, of hydroquinone and a nitrogen atmosphere which is substantially free from oxygen; said reaction being carried out under pressure at a temperature of from about 150° C. to about 220° C. for a time of from about 2 to about 24 hours to provide a substantial yield of 2-ethoxy-3,4,5,6,7,8-hexahydro-4-phenyl-2H-benzopyran product and recovery of said product from the reaction mixture.

15. The process of preparing 2-ethoxy-3,4,5,6,7,8-hexahydro-4-(3,4 - methylenedioxyphenyl) - 2H - benzopyran comprising the reaction of 1 mole equivalent of 2-piperonylidenecyclohexanone with from about 1 to about 4 mole equivalents of ethyl vinyl ether in the presence of up to about 1 mole percent, based on the reactants, of hydroquinone and a nitrogen atmosphere which is substantially free from oxygen; said reaction being carried out under pressure at a temperature of from about 150° C. to about 220° C. for a time of from about 2 to about 24 hours to provide a substantial yield of 2-ethoxy-3,4,5,6,7,8-hexahydro - 4 - (3,4 - methylenedioxyphenyl)-2H-benzopyran product and recovery of said product from the reaction mixture.

16. The process of preparing 2-ethoxy-3,4,5,6,7,8-hexahydro-4-(3,4-dimethoxyphenyl)-2H-benzopyran comprising the reaction of 1 mole equivalent of 2-veratrylidenecyclohexanone with from about 1 to about 4 mole equivalents of ethyl vinyl ether in the presence of up to about 1 mole percent, based on the reactants, of hydroquinone and a nitrogen atmosphere which is substantially free from oxygen; said reaction being carried out under pressure at a temperature of from about 150° C. to about 220° C. for a time of from about 2 to about 24 hours to provide a substantial yield of 2-ethoxy-3,4,5,6,7,8 - hexahydro - 4-(3,4 - dimethoxyphenyl) - 2H-benzopyran product and recovery of said product from the reaction mixture.

17. The process of preparing 1-(3,4-dimethoxyphenyl) - 3 - ethoxy - 1,2,3,4 - tetrahydro - 4 - oxa - 9-fluorenone comprising the reaction of 1 mole equivalent of 2-veratrylidene-1,3-indandione with from about 1 to about 4 mole equivalents of ethyl vinyl ether in the presence of up to about 1 mole percent, based on the reactants, of hydroquinone, xylene and a nitrogen atmosphere which is substantially free from oxygen; said reaction being carried out under pressure at a temperature of from about 150° C. to about 220° C. for a time of from about 2 to about 24 hours to provide a substantial yield of 1-(3,4-dimethoxyphenyl)-3-ethoxy-1,2,3,4-tetrahydro-4-oxa-9-fluorenone product and recovery of said product from the reaction mixture.

References Cited in the file of this patent

UNITED STATES PATENTS

| 2,421,570 | La Forge | June 3, 1947 |
| 2,514,168 | Smith et al. | July 4, 1950 |

OTHER REFERENCES

Longley et al., J. A. C. S., 72, pp. 3079–3081 (1950).
Chem. Abstracts, vol. 48—1954 Subject Index, p. 979 (Column 1).
Patterson-Capell: The Ring Index (Reinhold Publ. Corp.) (1940), p. 241.
Meerwein, J. für Prakt. Chem., vol. 116, pp. 240–7 (1927).
Sastry, J. Chem. Soc., vol. 109, pp. 175–180 (1916).